July 3, 1956 T. H. ROBERTSON 2,752,839
HOE
Filed Nov. 22, 1952
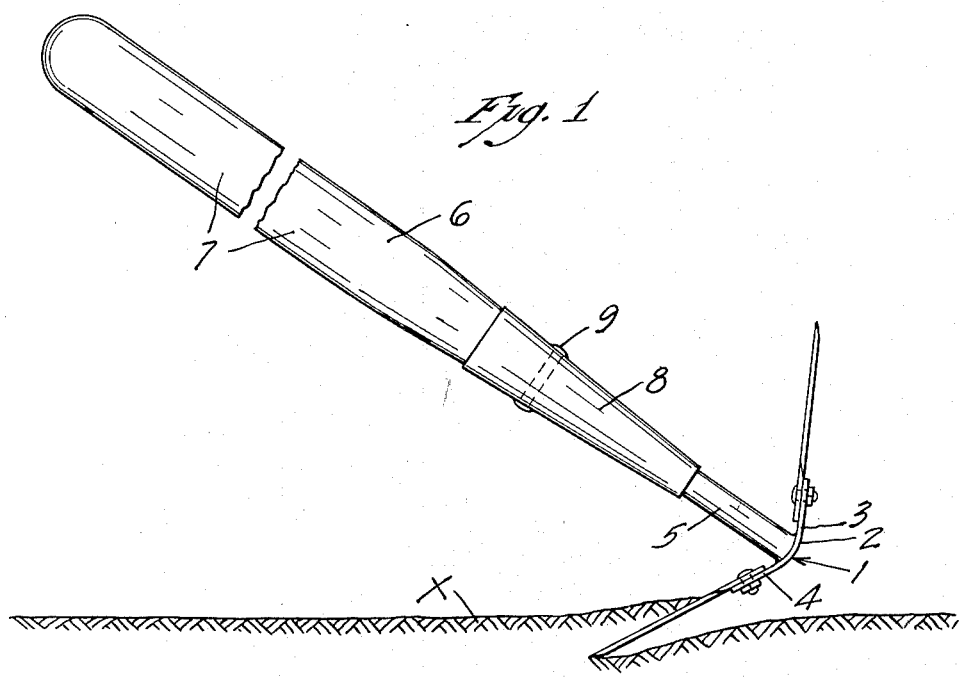
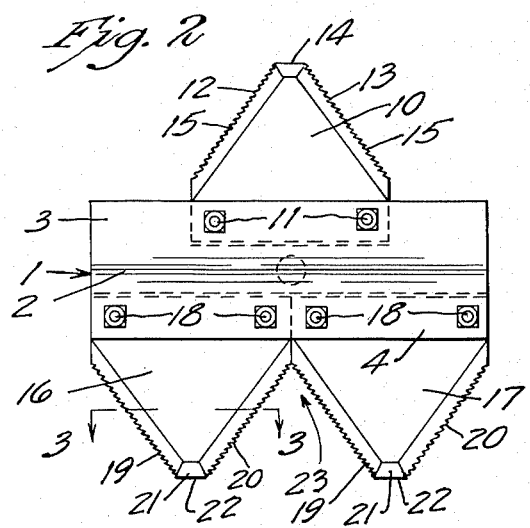
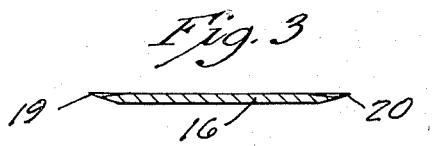
INVENTOR.
Thomas H. Robertson
BY
Merchant & Merchant
ATTORNEYS

United States Patent Office 2,752,839
Patented July 3, 1956

2,752,839

HOE

Thomas H. Robertson, Park Rapids, Minn.

Application November 22, 1952, Serial No. 321,979

1 Claim. (Cl. 97—66)

My invention relates generally to garden implements, and more particularly to improvements in hoes for weeding, cultivating and the like.

An important object of my invention is the provision of a hoe having blades projecting from opposite edges of a head and arranged to effectively perform a plurality of functions such as furrowing, weed cutting, cultivating and the like.

Another object of my invention is the provision of a hoe, the cutting blades of which may be quickly and easily removed for sharpening or replacement, and as easily reapplied.

Another object of my invention is the provision of a hoe having blades disposed at such angles with respect to the handle thereof that said blades will be directed at a relatively shallow angle with respect to the ground when the handle is in its normal operating position.

Still another object of my invention is the provision of a hoe comprising a flanged head having a single blade projecting outwardly from one flange thereof and a pair of cooperating blades projecting outwardly from the other flange thereof, and wherein adjacent side cutting edges of said pair of blades define opposite sides of a V-shaped notch.

Another object of my invention is the provision of a hoe as set forth, the blades of which have serrated cutting edges converging toward the outer ends of the blades.

A still further object of my invention is the provision of a hoe as set forth which is simple and inexpensive to manufacture, which is efficient in operation, and which is rugged in construction and durable in use.

The above and still further highly important objects and advantages of my invention will become apparent from the following detailed specification, appended claim and attached drawings.

Referring to the drawings, which illustrate the invention and in which like characters indicate like parts throughout the several views:

Fig. 1 is a fragmentary view in side elevation of a hoe built in accordance with my invention;

Fig. 2 is a view in end elevation of the hoe of Fig. 1;

Fig. 3 is a fragmentary section taken substantially on the line 3—3 of Fig. 2; and Fig. 4 is a view in front elevation of one of the blades of the hoe of my invention.

In the preferred embodiment of the invention illustrated, an angular plate-like head, indicated in its entirety by the numeral 1, is shown as including a central portion 2 and upper and lower flanges 3 and 4 respectively which are disposed at obtuse angles to each other. The head 1 is preferably formed from a relatively heavy rigid metal sheet or plate and has welded or otherwise rigidly secured to its central portion a metal shank or the like 5 which extends forwardly thereof between the flanges 3 and 4 and which bisects the angle formed by said flanges 3 and 4. The shank 5 is driven into the lower tapered end 6 of an elongated preferably wooden handle 7 which, at its tapered end 6 is preferably covered by a metallic ferrule 8. A rivet or pin 9 anchors the outer end of the shank 5, the tapered end portion 6 of the handle 7 and the ferrule 8 against relative movements in the conventional manner.

A single blade 10 is rigidly secured to the central portion of the flange 3 by nut-equipped screws or the like 11 and projects outwardly therefrom in a plane parallel to the plane of the flange 3. The blade 10 comprises a plate of hardened steel and is formed to provide outwardly converging side cutting edges 12 and 13 and a relatively short outer cutting end 14. Preferably and as shown, the side cutting edges 12 and 13 are serrated to provide relatively fine cutting teeth 15.

A pair of cutting blades 16 and 17, identical to the blade 10, are detachably anchored by means of nut-equipped screws or the like 18, in side by side relationship to the flange 4 of the head 1 and project outwardly therefrom in a plane parallel to the plane of the flange 4. Like the blade 10, the blades 16 and 17 are each formed to provide serrated cutting edges 19 and 20 which converge toward their outer ends 21, said outer ends being formed to provide relatively short outer cutting edges 22. With reference to Fig. 2 it will be seen that the side cutting edge 20 of the blade 16 and the adjacent side cutting edge 19 of the blade 17 converge toward the head 1 and define the opposite sides of a V-shaped notch 23.

In practice, I have found that best results are obtained when the head 1 is bent to a degree wherein the flanges 3 and 4 together with their respective cutting blades 10, 16 and 17 are disposed at an angle of approximately 130° to each other, the shank 5 and handle 7 substantially bisecting this angle. With the above arrangement, when the handle 7 is in its normal operating position with respect to the ground X as substantially indicated in Fig. 1, the cutting blades 16 and 17 enter the ground X at a relatively shallow angle with respect to the surface thereof. This relatively shallow angle permits the blades to be drawn easily through the ground thus reducing to a considerable degree the required effort on the part of the operator. I have found through considerable experiments that the roots of noxious weeds such as quack grass and the like are severed below the level of the ground thereby reducing the percentage of regrowth of the weeds substantially. The serrated cutting edges of the blades tend to bite into the roots so that the roots do not slide away from the blades and the cutting action of the blades through the roots is accomplished with less effort than would be required with a smooth-edged blade.

My improved hoe is capable of a wide variety of uses in the garden. For instance, the single blade 10 may be used for cultivating between plants where the roots thereof are relatively close together, and in forming furrows for seeding. After a furrow, formed by the blade 10, has been seeded, my improved hoe may be utilized to cover the furrow merely by inverting the hoe so that the blades 16 and 17 point downwardly so as to straddle the furrow. The hoe is then drawn longitudinally of the furrow to fill the same with soil. It should be noted that, when the blades 16 and 17 are used for cultivating or weed cutting, any roots which come within the notch 23 would be engaged by the adjacent cutting edges of both blades. Thus roots of relatively large diameter are severed relatively easily inasmuch as cutting thereof is initiated at the opposite side portions thereof. I have found that conventional sickle knives are particularly well adapted for use as the several cutting blades 10, 16 and 17. Such sickle knives are commonly used in mowing and harvesting equipment and provide an efficient angle of divergence for the sides of the notch 23 between the blades 16 and 17, such angle being approximately 60°. In practice, I prefer to use standard sickle knives modifying the same only in the grinding of the outer ends thereof to provide the relatively short cutting edges 14 and 22 on the blades 10 and 16 and 17 respectively.

Removal of the blades 10, 16 and 17 for resharpening or replacement is easily accomplished by removal of their respective screws 11 and 18. If desired, the knives may be resharpened while remaining fast on the head 1. However, in the event of breakage of any one of the blades, replacement thereof is a simple and inexpensive operation.

My invention has been thoroughly tested and found to be completely satisfactory for the accomplishment of the objectives set forth; and while I have shown and described a commercial embodiment of my novel hoe it will be understood that the same is capable of modification without departure from the spirit and scope of the invention as defined in the claim.

What I claim is:

In a hoe, a head comprising a pair of flanges diverging outwardly from the central portion of the head and defining an angle therebetween of substantially 130°, a shank extending forwardly of the central portion of the head between said flanges and bisecting the angle between said flanges into equal parts, a handle on said shank, a sickle knife defining a plate-like furrowing blade, means removably mounting said blade on one of said flanges intermediate its ends, said blade projecting outwardly from said flange and having sharp side cutting edges converging toward the outer end of the blade, a pair of sickle knives defining cultivator blades, and means removably mounting said cultivator blades on the other of said flanges in side by side relationship, each of said cultivator blades having sharp side cutting edges converging toward the outer ends thereof, the adjacent cutting edges of said cultivator blades defining opposite sides of a V-shaped notch, each of said blades extending in a plane parallel to the plane of its cooperating flange.

References Cited in the file of this patent

UNITED STATES PATENTS

| | | |
|---|---|---|
| D. 154,303 | Pavlinetz | June 28, 1949 |
| 1,037,590 | Bush | Sept. 3, 1912 |
| 1,148,534 | Pringle | Aug. 3, 1915 |
| 1,469,957 | Rich | Oct. 9, 1923 |
| 1,800,905 | Rieff | Apr. 14, 1931 |

FOREIGN PATENTS

| | | |
|---|---|---|
| 371,824 | Germany | Mar. 22, 1923 |
| 583,071 | Great Britain | Dec. 6, 1946 |